No. 653,741. Patented July 17, 1900.
W. M. JEWELL.
METHOD OF PURIFYING WATER.
(Application filed Nov. 7, 1898.)
(No Model.)
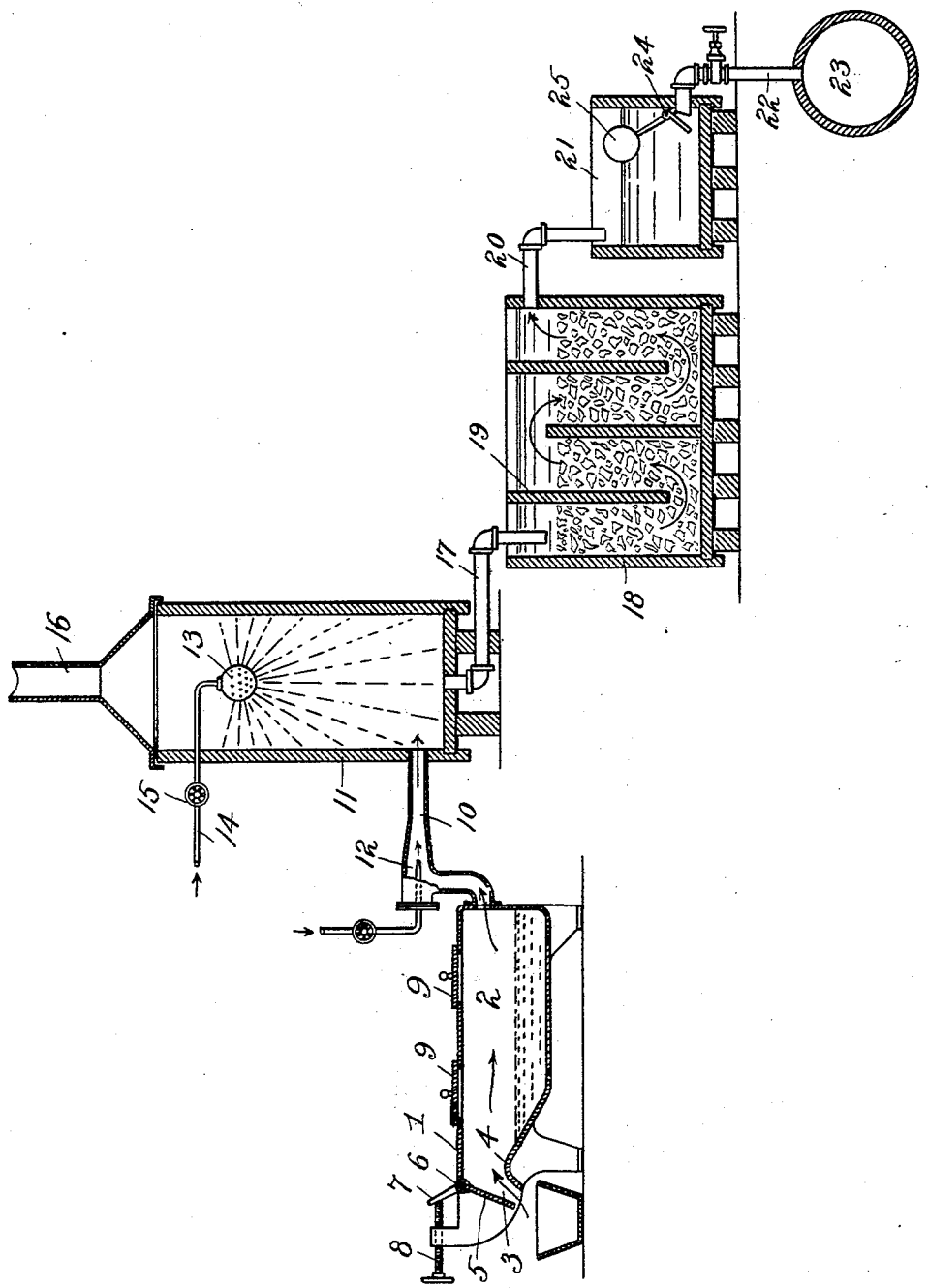

UNITED STATES PATENT OFFICE.

WILLIAM M. JEWELL, OF CHICAGO, ILLINOIS.

METHOD OF PURIFYING WATER.

SPECIFICATION forming part of Letters Patent No. 653,741, dated July 17, 1900.

Application filed November 7, 1898. Serial No. 695,709. (No specimens.)

*To all whom it may concern:*

Be it known that I, WILLIAM M. JEWELL, a citizen of the United States, residing at Chicago, in the county of Cook and State of Illinois, have invented a certain new and Improved Method of Purifying Water, of which the following is a specification, reference being had to the accompanying drawing.

This invention relates to an improved process for the coagulation of suspended substances and impurities in waters, sewage, or other liquids for the purpose of causing such substances to coalesce or agglomerate, so that they may readily be intercepted by and retained in the bed of a filter or may otherwise be readily separated and removed from the liquid in which they were originally carried.

My improved process consists in producing an anhydride gas, best accomplished by the oxidation of sulphur or sulphurous substances producing sulphurous-oxide gas, the gas produced being dissolved in water to form an acid, forming, when sulphurous oxide is used, sulphurous acid, the acid being passed through or in contact with any suitable metal or metallic compound soluble in or decomposed by it. Metallic iron, bauxite, or any suitable compound of iron or aluminium soluble in or decomposed by sulphurous acid are best employed with such acid, the iron or aluminium being thereby dissolved, and where an iron compound is used ferrous bisulphite being produced. The solution of ferrous bisulphite or equivalent salt is then introduced into the water or other liquid to be purified, where it is decomposed and a flocculent adhesive precipitate of ferric or of ferrous hydrate produced, the latter of which, in the presence of oxidizing agents, is rapidly converted into ferric hydrate. The water to be purified is then treated with the precipitate, either by sedimentation or filtration, as hereinafter described. Both the ferrous and the ferric hydrates are suitable for coagulating the impurities in water and when mixed with the water act to agglomerate the suspended impurities, so that they are more readily retained by the filter-bed when the water is passed through a filter or may be otherwise separated from the water. The soluble salt of iron, aluminium, or equivalent metal employed to form the hydrate may ordinarily be precipitated by the magnesia, lime, or other alkalies commonly found in waters and sewage, the precipitation being promoted, in the case of ferrous iron, by the free oxygen usually present in the water. Where, however, the liquid to be purified is deficient in substances capable of precipitating the iron or equivalent salt, an alkaline reagent—such as lime, lime-water, soda, &c.—may be added to it, or, if desired, instead of adding the reagent to the water to be purified the solution of iron bisulphite may first be precipitated by an alkali or equivalent precipitant and the iron hydrates thus formed be added to the liquid to be purified. The best results are, however, usually obtained by effecting the precipitation after the metallic-salt solution is added to the water. As the presence of carbonic-acid gas retards the precipitation of ferrous salts, but not of ferric or of salts of aluminium, liquids containing excessive quantities of carbonic acid due to decomposed organic matter or other causes generally require the addition of a secondary reagent, such as lime or soda, when a ferrous salt is used to promote precipitation, or in lieu thereof the introduction of a coagulant in insoluble form, as above suggested, and in some cases it may be necessary to oxidize the ferrous bisulphite to the ferric state, as described and claimed in my application filed August 17, 1899, Serial No. 727,543, before adding it to the water to be purified. When this is to be done, any suitable oxidizing agent or process may be used—such, for example, as ozone, chlorin, or potassium permanganate. Such oxidizing substances, when used, may be fed in with the iron solution or may be introduced in gaseous form.

In the drawing I have shown a form of apparatus designed for the production and utilization of sulphurous-oxide gas in accordance with my improved process; but it should be understood that my present invention is not limited to the use of any particular apparatus, as it has to do only with the process, the apparatus being the subject of my application, Serial No. 699,682, filed December 19, 1898.

Referring to the drawing, which is a longitudinal sectional view of the principal parts of the apparatus, 1 indicates a retort or vessel which is adapted to contain the sulphur or other material used to produce the sulphurous-oxide gas. The retort 1 is provided with a combustion-chamber 2, which to secure the best results is elongated, as shown in the drawing. The combustion-chamber 2 is supplied with air through a port 3 at or near one end thereof. Between the port 3 and the combustion-chamber is a bridge-wall 4, which prevents the escape of the molten sulphur.

5 indicates a door for the port 3, said door being hinged at 6 and being provided with an arm 7, which projects at an angle to the door and rests against the end of an adjusting-screw 8, so that the position of the door may be adjusted as desired for the purpose of regulating the quantity of air admitted through the port 3. By arranging the port 3 near the level of the molten sulphur, as shown, the removal of the scum or lava is facilitated.

9 indicates covers for holes provided in the top of the retort for supplying sulphur or cleaning the retort.

10 indicates a pipe which communicates with the combustion-chamber at or near the end opposite the port 3 and serves to convey the gas generated therein to a condensing-tank 11.

The gas generated in the combustion-chamber 3 is drawn therefrom through pipe 10 by suction created by a steam-jet 12, which projects into pipe 10 and discharges thereinto in the direction of the tank 11. By this means not only is a suction created which supplies oxygen to the retort and carries the sulphurous oxide through pipe 10, but also the steam is thoroughly intermixed with the sulphurous oxide while both are at a high temperature, thereby promoting the formation of sulphurous acid. Upon reaching the tank 11 the sulphurous acid is condensed and hydrous sulphurous acid formed by water sprayed into said tank through a perforated rose 13 or other suitable device, connected to a water-pipe 14, having a regulating-valve 15, and any gas remaining undissolved by the steam is subjected to the action of the water introduced through the ring, so that usually all passes into solution. Any excess of gas, however, may escape through a vent-pipe 16. From the tank 11 the freshly-formed hydrous sulphurous acid is discharged through a pipe 17 into a dissolving-tank 18, adapted to contain iron, (or other substance to be treated,) preferably in the form of scrap — such as punchings, shearings, borings, &c. The pipe 17 terminates below the normal level of the solution in the tank 18, thereby forming a seal which prevents free sulphurous oxide from entering said tank through said pipe. The acid solution is caused to flow through the tank 18, passing out at the end opposite that at which it enters, and in order to obtain the longest possible contact of the acid and iron division plates or partitions 19 are provided, which are placed in the tank 18 and are secured alternately at the top and bottom thereof, every other one of the partitions terminating near the bottom of the tank and the intermediate partitions terminating below the top thereof, all the partitions being secured at their ends to the sides of the tank, so that the acid solution is compelled to travel up and down and lengthwise of the tank, as indicated by the arrows in the drawing, finally reaching an outlet-pipe 20 at the end of the tank 18 opposite that at which it entered. By thus causing the sulphurous acid to flow over scrap-iron ferrous bisulphite is formed in solution in the dissolving-tank 18, such solution being discharged through the pipe 20. The latter pipe discharges into a reservoir or tank 21, and the latter communicates by a pipe 22 with a main suction-pipe 23, which conveys the water or other liquid to be purified. A valve 24, controlled by a float 25 in the tank 21, is provided to close the pipe 22 when the tank 21 is empty, thereby preventing air from entering the water-main 23. This valve, however, may be dispensed with where there is no objection to air entering the main 23—as, for example, where said main is under pressure. Where the main 23 is under heavy pressure and cannot be supplied conveniently with the iron solution by gravity, a force-pump may be used, which may be connected to the pipe 22, the discharge being into the main 23, or an elevated tank or reservoir may be used.

The operation of the apparatus has already been described generally; but it may be added that a charge of sulphur is placed in the retort 1 and the tank 18 is filled with scrap-iron, after which the sulphur is ignited and the cover-plate 9 replaced. The steam-jet is then started, carrying the fumes through pipe 10 to the tank 11, hydrous sulphurous acid being produced in pipe 10 and in the condensing-tank. The sulphurous-acid solution formed passes through the pipe 17 into the tank 18, where it flows over and through the iron scrap therein, producing a ferrous-bisulphite solution there. The solution after its production is discharged through the pipe 20 into the reservoir or tank 21, and thence passes to the water-main 23, where the chemical action already described takes place, resulting in the formation of a hydrate of iron, which acts to coagulate the impurities contained in the water. The water may then be filtered through a granular filter or may first be partially purified by being permitted to stand in a settling-basin, or the coagulated impurities may be removed by other suitable means.

It will of course be understood that when some other reagent equivalent to the iron-salt solution is to be made the appropriate metal or compound thereof is placed in the tank 18, and it should also be understood that the term "iron" as used in the claims includes any other equivalent substance which may be substituted for it to produce substantially the same result.

From the foregoing description it will be noted that a continuous process is provided for the production of the coagulating reagent and its introduction into the water to be purified. This continuous operation is of special importance, as by it the coagulating reagent is introduced into the water while perfectly fresh, thereby utilizing it when most efficient. A further advantage is that the supply of the coagulating reagent may be more accurately regulated.

That which I claim as my invention, and desire to secure by Letters Patent, is—

1. The method of purifying water which consists in introducing thereinto a solution formed by passing sulphurous acid in solution over iron, and removing the coagulated impurities, substantially as described.

2. The method of purifying water consisting in generating a suitable anhydride gas, combining the gas with water, passing the acid so formed over iron, subjecting the resulting metallic-salt solution to the action of a suitable precipitant to form a substantially water-insoluble flocculent precipitate, treating the water to be purified with such precipitate, and then separating the coagulated matter from the water, substantially as described.

3. A continuous process for the purification of water, consisting of the following steps, generating sulphurous oxide, combining the oxide with water, passing the sulphurous acid so formed over iron, introducing the metallic-salt solution thereby formed into the water to be purified, and separating the coagulated impurities from the water, substantially as described.

4. The method of producing coagulation of impurities in water, which consists in generating a suitable anhydride gas, conducting it into water, subjecting iron to the action of the resulting acid, treating the salt thereby produced with a suitable precipitant, and separating the water from the resulting precipitate, substantially as described.

5. The method of producing coagulation of impurities in water, which consists in generating a suitable anhydride gas, conducting it into water, subjecting iron to the action of the resulting acid, and introducing the salt solution so produced into the water to be treated, substantially as described.

6. The method of purifying water, which consists in generating a suitable anhydride gas, conducting it into water, subjecting iron to the action of the resulting acid, introducing the salt solution so produced into the water to be treated, adding a suitable precipitant thereto, and separating the water from the resulting precipitate, substantially as described.

7. The method of purifying water consisting in generating sulphurous oxide, passing the oxide into water, subjecting iron to the action of the sulphurous acid thereby formed, oxidizing the resulting solution, subjecting it to the action of a suitable precipitant and separating the water from the resulting precipitate, substantially as described.

WILLIAM M. JEWELL.

Witnesses:
JOHN L. JACKSON,
ALBERT H. ADAMS.